United States Patent [19]
Nobuoka

[11] Patent Number: 5,552,836
[45] Date of Patent: Sep. 3, 1996

[54] IMAGE SIGNAL PROCESSING APPARATUS IN WHICH THE ADC AND/OR THE 1DHL HAVE LOW POWER CONSUMPTION DURING VERTICAL BLANKING

[75] Inventor: Kousuke Nobuoka, Yokohama, Japan

[73] Assignee: Canon Kabushiki Kaisha, Tokyo, Japan

[21] Appl. No.: 311,890

[22] Filed: Sep. 26, 1994

Related U.S. Application Data

[63] Continuation of Ser. No. 221,710, Jan. 31, 1994, abandoned, which is a continuation of Ser. No. 976,339, Nov. 13, 1992, abandoned.

[30] Foreign Application Priority Data

Dec. 19, 1991 [JP] Japan ..................... 3-336991

[51] Int. Cl.$^6$ ................ H04N 3/24; H04N 5/63
[52] U.S. Cl. ........................ 348/730; 348/634
[58] Field of Search ................... 348/372, 572, 348/634–637, 730; 345/211–213; H04N 3/24, 1/38, 5/63

[56] References Cited

U.S. PATENT DOCUMENTS 4,700,221 10/1987 Yamamoto et al. ............... 358/44
4,740,828 4/1988 Kinoshita ......................... 358/41 X Primary Examiner—Safet Metjahic
Assistant Examiner—Cheryl Cohen
Attorney, Agent, or Firm—Fitzpatrick, Cella, Harper & Scinto

[57] ABSTRACT

In an image signal processing apparatus which processes image signals, a plurality of different kinds of digital image signals are formed by delaying a digital image signal which was obtained by digitizing an analog image signal. When new digital image signals are formed using the plurality of different kinds of digital image signals, the apparatus is controlled so that a power-consumption state of at least one of a circuit for forming digital image signals and a circuit for delaying digital image signals is lower during a predetermined time period within the analog image signal. It it thereby possible to reduce power consumption of the apparatus, and to simplify the circuitry of the apparatus.

45 Claims, 3 Drawing Sheets

FIG.1
PRIOR ART

|   | 1  | 2  | 3  | 4  | 5  | 6  |   |   |   |
|---|----|----|----|----|----|----|---|---|---|
| 1 | Wr | Gb | Wr | Gb | Wr | Gb | • | • | • |
| 2 | Gr | Wb | Gr | Wb | Gr | Wb | • | • | • |
| 3 | Wr | Gb | Wr | Gb | Wr | Gb | • | • | • |
| 4 | Gr | Wb | Gr | Wb | Gr | Wb | • | • | • |
| 5 | •  | •  | •  | •  | •  | •  | • | • | • |
|   | •  | •  | •  | •  | •  | •  | • | • | • |

FIG.2

|   | 1  | 2 | 3  | 4 | 5  | 6 |   |   |
|---|----|---|----|---|----|---|---|---|
| 1 | Wr |   | Wr |   | Wr |   | • | • |
| 2 |    |   |    |   |    |   |   |   |
| 3 | Wr |   | Wr |   | Wr |   | • | • |
| 4 |    |   |    |   |    |   |   |   |

IMAGE SIGNAL PROCESSING APPARATUS IN WHICH THE ADC AND/OR THE 1DHL HAVE LOW POWER CONSUMPTION DURING VERTICAL BLANKING

This application is a continuation of application Ser. No. 08/221,710 filed Jan. 31, 1994, which is a continuation of Ser. No. 07/976,339, filed Nov. 13, 1992, both now abandoned.

BACKGROUND OF THE INVENTION

1. Field of the Invention

This invention relates to an image signal processing apparatus which processes image signals.

2. Description of the Prior Art

In a single-plate color video camera for commercial use or the like, a striped filter is mounted in front of a solid-state image pickup device whose output is subjected to sampling, and a luminance signal, a color-difference signal, and R, G and B signals are formed by performing interpolation whenever necessary. As is known, R, G and B represent red, green and blue.

For example, an output from a solid-state image pickup device which mounts a complementary-color filter comprises signals as shown in FIG. 1. If attention is paid to a signal Wr (=2R+G+B), Wr signals are obtained only at every other picture element in the horizontal direction, and at every other line (every two lines in the case of interlaced scanning) in the vertical direction, as shown in FIG. 2. For the remaining picture elements, an average value of surrounding Wr signals is adopted, for example, as shown in FIG. 3. This processing is termed simultaneous processing. Wb (=R+G+2B), Gb (=2G+B), and Gr (=R +2G) signals obtained by the above-described simultaneous processing are subjected to matrix calculation, whereby a luminance signal, a color-difference signal, and R, G and B signals are obtained.

Recently, the above-described camera signal processing has been digitized, and line memories have been used as 1H delay means for performing interline processing. The output of the image pickup device is first converted into a digital signal by an A/D (analog-to-digital) converter, and thereafter the above-described processing and other kinds of camera signal processing are performed.

While it is possible to exactly perform complicated signal processing with the digital signals, it is necessary to provide an A/D converter, signal lines for the number of bits, and the like, causing an increase in the scale of circuitry. In particular, the A/D converter consumes greater electric power than other circuits. Hence, it is difficult to mount the A/D converter in the form of a chip, and to reduce power consumption of the entire signal processing apparatus.

SUMMARY OF THE INVENTION

It is an object of the present invention to provide an image signal processing apparatus which can overcome the above-described problems in the prior art.

It is another object of the present invention to provide an image signal processing apparatus which can simplify the circuitry of the apparatus.

According to one aspect, the present invention which achieves these objectives relates to an image signal processing apparatus for processing image signals, comprising conversion means for inputting an analog image signal, converting the input analog image signal into a digital image signal, and outputting the resultant signal, delay means for forming and outputting a plurality of different kinds of digital image signals by delaying the digital image signal output from the conversion means, digital image signal forming means for forming and generating new digital image signals using the plurality of different kinds of digital image signals output from the conversion means and the delay means, and control means for controlling at least one of the conversion means and the delay means so that a power-consumption state of at least one of the conversion means and the delay means is smaller during a predetermined time period than during other time periods.

It is still another object of the present invention to provide an image signal processing apparatus which can reduce the power consumption of the apparatus.

According to another aspect, the present invention which achieves the above-described objectives relates to an image signal processing apparatus for processing image signals, comprising conversion means for inputting an analog image signal, converting the input analog image signal into a digital image signal, and outputting the resultant signal, digital signal processing means for processing the digital image signal output from the conversion means, detection means for detecting a predetermined time period in the analog image signal input to the conversion means, and electric-power supply means for controlling a state of electric power supply to the conversion means in accordance with a result of the detection by the detection means.

According to a further aspect of the present invention, an image signal processing apparatus for processing image signals comprises image pickup means for imaging an object, and for generating an analog image signal corresponding to the imaged object. Conversion means are provided for receiving the analog image signal generated by the image pickup means, for converting the received analog image signal into a digital image signal, and for outputting the digital image signal. Digital image signal processing means are provided for processing the digital image signal output from said conversion means. Control means are provided for controlling said conversion means so that a power-consumption state of said conversion means is smaller during a predetermined period of time than during other times.

According to yet another aspect of the present invention, an image signal processing apparatus for processing image signals includes image pickup means for imaging an object, and for generating an analog image signal corresponding to the imaged object. Conversion means are provided for receiving the analog image signal generated by the image pickup means, for converting the received analog image signal into a digital image signal, and for outputting the digital image signal. Digital signal processing means are provided for processing the digital image signal output from said conversion means, and detection means are provided for detecting a predetermined time in the analog image signal generated by said image pickup means. Electric power supply means are provided for varying a supply of power to said conversion means in accordance with a result of the detection by said detection means.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 1 is a diagram illustrating output signals from an image pickup device having a complementary-color filter;

FIG. 2 is diagram illustrating the arrangement of signals Wr;

DETAILED DESCRIPTION OF THE PREFERRED EMBODIMENTS

Preferred embodiments of the present invention will now be described with reference to the drawings.

Figure 3:
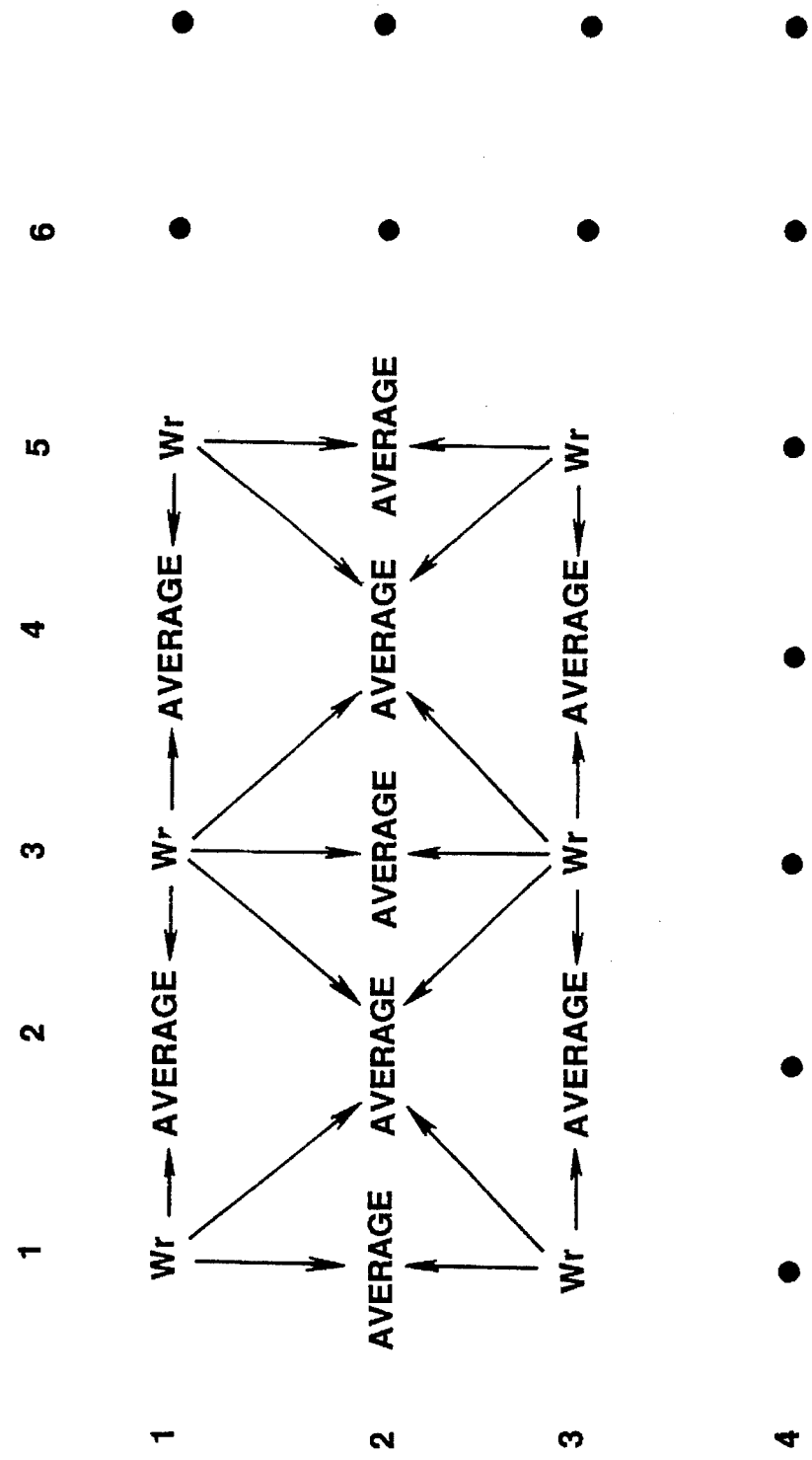
FIG. 3 is a diagram illustrating an example of simultaneous calculation processing.
Figure 4:
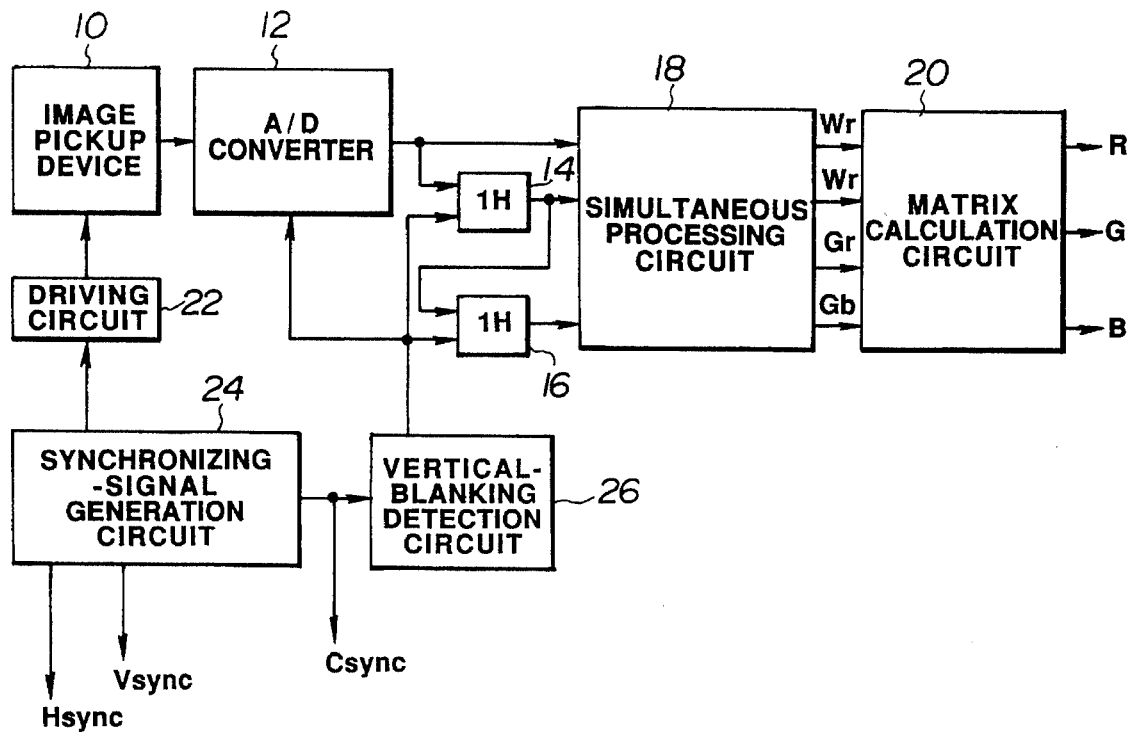
FIG. 4 is a block diagram showing the configuration of an apparatus according to an embodiment of the present invention.

FIG. 4 is a block diagram showing the configuration of an apparatus according to an embodiment of the present invention. In FIG. 4, reference numeral 10 represents a CCD (charge-coupled device) solid-state image pickup device. An A/D converter 12 converts an analog signal output from the solid-state image pickup device 10 into a digital signal. Line memories 14 and 16 serve as delay means for 1H (one horizontal period). The line memory 14 delays the output of the A/D converter 12 by 1H, and the line memory 16 delays the output of the line memory 14 by 1H. A simultaneous processing circuit 18 performs the above-described simultaneous processing using the outputs of the A/D converter 12 and the line memories 14 and 16. A matrix calculation circuit 20 performs matrix calculation of the output of the simultaneous processing circuit 18, and generates R, G and B signals.

A driving circuit 22 drives the image pickup device 10. A synchronizing-signal generation circuit 24 generates a clock signal, a horizontal synchronizing signal Hsync, a vertical synchronizing signal Vsync, and a composite synchronizing signal Csync which are necessary for the driving circuit 22. A vertical-blanking detection circuit 26 detects a vertical blanking period from the composite synchronizing signal Csync generated by the synchronizing-signal generation circuit 24, and places the A/D converter 12 and the line memories 14 and 16 in a state in which power supplied to those circuits is turned off (or power consumption is made to be low) during the detected vertical blanking period.

Although, in FIG. 4, the composite synchronizing signal Csync generated by the synchronizing-signal generation circuit 24 is directly supplied to the vertical-blanking detection circuit 26, the signal Csync may, of course, be supplied to the vertical-blanking detection circuit 26 via other circuitry.

The operation of the apparatus of the present embodiment will now be described. The driving circuit 22 drives the image pickup device 10 in accordance with the clock signal from the synchronizing-signal generation circuit 24. The output of the image pickup device 10 is converted into a digital signal by the A/D converter 12, and is supplied to the simultaneous processing circuit 18 and the line memory 14. The output of the line memory 14 is supplied to the simultaneous processing circuit 18 and the line memory 16. The output of the line memory 16 is supplied to the simultaneous processing circuit 18. That is, signals on three adjacent lines are simultaneously supplied to the simultaneous processing circuit 18.

The simultaneous processing circuit 18 generates spatially-matched complementary-color signals Mg, Yw, G and Cy from the signals on the three adjacent lines. The matrix calculation circuit 20 performs matrix calculation of the complementary-color signals from the simultaneous processing circuit 18, and forms R, G and B signals.

The vertical-blanking detection circuit 26 detects the vertical blanking period from the composite synchronizing signal Csync generated by the synchronizing-signal generation circuit 24, and places the A/D converter 12 and the line memories 14 and 16 in a state in which the power supplied to those circuits is turned off (or power consumption is made to be low). If there is no problem in the operation of the A/D converter 12 and the line memories 14 and 16 by turning on and off the power supply, the power supply is completely turned off during the vertical blanking period. If the operation of the above-described devices becomes unstable when the power supply is turned back on, the power supply is turned on earlier by a time required for stabilizing the operation during the vertical blanking period. Alternatively, the A/D converter 12 and the line memories 14 and 16 are placed in a standby state in which power consumption is small enough so that the circuits are capable of achieving stable operation after the vertical blanking period.

Figure 5:
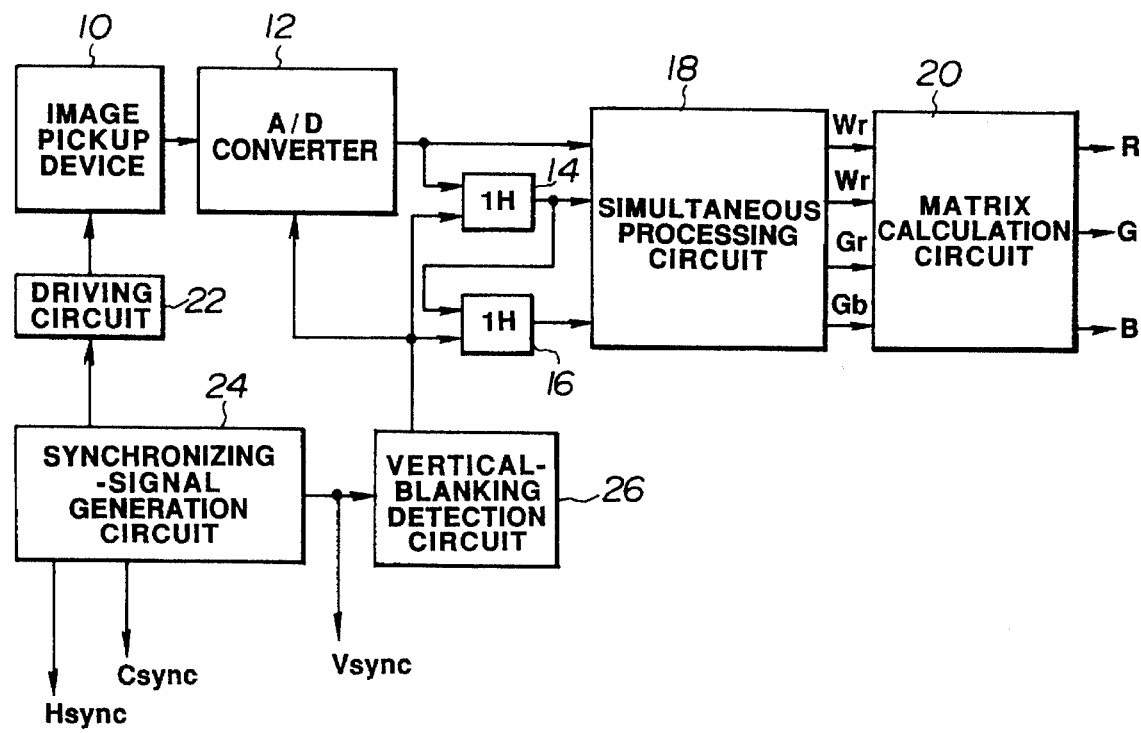
FIG. 5 is a block diagram showing the configuration of an apparatus according to another embodiment of the present invention.

Although, in FIG. 4, the vertical blanking detection circuit 26 detects the vertical blanking period from the composite synchronizing signal Csync generated by the synchronizing-signal generation circuit 24, the vertical blanking period may be detected from the vertical synchronizing signal Vsync, as shown in FIG. 5.

When the image pickup device 10 is driven in synchronization with other image signals input from the outside, the vertical blanking period may be detected from the composite synchronizing signal or the vertical synchronizing signal separated from the picture signal input from the outside.

As can be easily understood from the foregoing description, according the preferred embodiments, it is possible to reduce power consumption during the vertical blanking period. Furthermore, since A/D conversion of the output of the image pickup device is not performed during the vertical blanking period, the amount of digital signals per field or frame is reduced. Hence, the size of a field memory or a frame memory and a digital signal processing circuit accompanying the memory can be reduced, whereby power consumption can be reduced.

The individual components shown in outline or designated by blocks in the Drawings are all well-known in the image processing arts and their specific construction and operation are not critical to the operation or best mode for carrying out the invention.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An image signal processing apparatus for processing image signals, said apparatus comprising:

conversion means for receiving an analog image signal, converting the received analog image signal into a digital image signal, and outputting the resultant signal;

delay means for receiving the resultant signal output by said conversion means, and for forming and outputting a plurality of different kinds of digital image signals by delaying the resultant signal;

digital image signal forming means for receiving the plurality of different kinds of digital image signals output from said delay means and the resultant signal output by said conversion means, and for generating new digital image signals from the received signals; and control means for controlling at least one of said conversion means and said delay means so that a power-consumption state of at least one of said conversion means and said delay means is lower during a predetermined time period within the received analog image signal.

2. An apparatus according to claim 1, wherein the predetermined time period includes a vertical blanking period of the received analog image signal.

3. An apparatus according to claim 1, wherein the analog image signal includes an analog color image signal comprising a plurality of different kinds of analog color-component signals which are time-division multiplexed signals.

4. An image signal processing apparatus for processing image signals, said apparatus comprising:

conversion means for receiving an analog image signal, converting the received analog image signal into a digital image signal, and outputting the resultant signal;

digital signal processing means for receiving and processing the resultant signal output from said conversion means;

detection means for detecting a predetermined time period in the analog image signal input to said conversion means; and electric-power supply means for controlling a supply of electric power to said conversion means in accordance with a result of the detection by said detection means.

5. An apparatus according to claim 4, wherein the predetermined time period includes a vertical blanking period.

6. An apparatus according to claim 4, wherein the received analog image signal includes an analog color image signal comprising a plurality of different kinds of analog color-component signals which are time-division multiplexed signals.

7. An image signal processing apparatus for processing image signals, said apparatus comprising:

image pickup means for imaging an object, and for generating an analog image signal corresponding to the image object;

conversion means for receiving the analog image signal generated by said image pickup means, for converting the received analog image signal into a digital image signal, and for outputting the digital image signal;

digital image signal processing means for processing the digital image signal output from said conversion means; and control means for controlling said conversion means so that a power-consumption state of said conversion means is smaller during a predetermined period of time within the received analog image signal.

8. An apparatus according to claim 7, wherein the predetermined period of time includes a vertical blanking period of the received analog image signal.

9. An apparatus according to claim 7, wherein said image pickup means includes an image pickup device having a color filter, and wherein said image pickup means generates an analog color image signal.

10. An apparatus according to claim 9, wherein said image pickup means generates an analog color image signal which includes a plurality of different kinds of analog color-component signals which are time-division multiplexed.

11. An apparatus according to claim 10, wherein said digital image signal processing means includes a simultaneous processing circuit for performing simultaneous processing of the digital color image signal output from said conversion means and outputting the resultant signals, and a digital matrix circuit for forming new digital color image signals using the signals output from said simultaneous processing circuit.

12. An image signal processing apparatus for processing image signals, said apparatus comprising:

image pickup means for imaging an object, and for generating an analog image signal corresponding to the imaged object;

conversion means for receiving the analog image signal generated by said image pickup means, for converting the received analog image signal into a digital image signal, and for outputting the digital image signal;

digital signal processing means for processing the digital image signal output from said conversion means;

detection means for detecting a predetermined time period in the analog image signal generated by said image pickup means; and electric-power supply means for varying a supply of power to said conversion means in accordance with a result of the detection by said detection means.

13. An apparatus according to claim 12, wherein the predetermined time period includes a vertical blanking period of the picture signal.

14. An apparatus according to claim 12, wherein said image pickup means includes an image pickup device having a color filter, and wherein said image pickup means generates an analog color image signal.

15. An apparatus according to claim 14, wherein said image pickup means generates an analog color image signal which includes a plurality of different kinds of analog color-component signals which are time-division multiplexed.

16. An apparatus according to claim 15, wherein said digital picture signal processing means includes a simultaneous processing circuit for performing simultaneous processing of the digital color image signal output from said conversion means and outputting the resultant signals, and a digital matrix circuit for forming new digital color image signals using the signals output from said simultaneous processing circuit.

17. An image signal processing apparatus for processing image signals, said apparatus comprising:

conversion means for receiving an analog image signal, converting the received analog image signal into a digital image signal, and for outputting the digital image signal;

delay means for forming and outputting a plurality of different kinds of digital image signals by delaying the digital image signal output from said conversion means;

digital image signal forming means for forming and generating new digital image signals using the plurality of different kinds of digital image signals output from said delay means; and control means for controlling at least one of said conversion means and said delay means so that a power-consumption state of at least one of said conversion means and said delay means is smaller during a predetermined time period than during a different time period.

18. Apparatus according to claim 17, wherein the predetermined time period includes a vertical blanking period of the analog image signal.

19. Apparatus according to claim 17, wherein the analog image signal includes an analog color image signal comprising a plurality of different kinds of analog color-component signals which are time-division multiplexed.

20. Apparatus according to claim 17, wherein said control means controls at least one of said conversion means and said delay means so that at least one of said conversion means and said delay means is set to a lower power consumption state during the predetermined time period than during other time periods.

21. Apparatus according to claim 17, wherein said control means includes electric power supply means for supplying power to at least one of said conversion means and said delay means to control at least one of the converting operation of said conversion means and the delaying operation of said delay means, and wherein said control means varies the supply of power from said electric power supply means to at least one of said conversion means and said delay means during the predetermined time period and the different time period.

22. Apparatus according to claim 17, wherein said control means includes electric power supply means for supplying power to at least one of said conversion means and said delay means to control at least one of the converting operation of said conversion means and the delaying operation of said delay means, and wherein said control means stops the supply of power from said electric power supply means to at least one of said conversion means and said delay means during the predetermined time period.

23. An image signal processing apparatus for processing image signals, comprising:

conversion means for receiving an analog image signal, converting the received analog image signal into a digital image signal, and for outputting the digital image signal;

digital signal processing means for processing the digital image signal output from said conversion means;

detection means for detecting a predetermined time period in the analog image signal input to said conversion means; and control means for controlling an operation state of said conversion means so that a power consumption state of said conversion means is smaller during the predetermined time period than during a different time period in accordance with a result of the detecting of the predetermined time period by said detection means.

24. Apparatus according to claim 23, wherein the predetermined time period includes a vertical blanking period of the analog image signal.

25. Apparatus according to claim 23, wherein the analog image signal includes an analog color image signal comprising a plurality of different kinds of analog color-component signals which are time-division multiplexed.

26. Apparatus according to claim 23, wherein said control means controls said conversion means so that said conversion means is placed in a lower power consumption state during the predetermined time period than during other time periods.

27. Apparatus according to claim 23, wherein said control means includes electric power supply means for supplying power to said conversion means to control the converting operation of said conversion means, and wherein said control means varies the supply of power from said electric power supply means to said conversion means during the predetermined time period and the different time period.

28. Apparatus according to claim 23, wherein said control means includes electric power supply means for supplying power to said conversion means to control the converting operation of said conversion means, and wherein said control means stops the supply of power from said electric power supply means to said conversion means during the predetermined time period.

29. An image signal processing apparatus for processing image signals, comprising:

image pickup means for imaging an object, and for generating an analog image signal corresponding to the imaged object;

conversion means for receiving the analog image signal generated by said image pickup means, for converting the received analog image signal into a digital image signal, and for outputting the digital image signal;

digital image signal processing means for processing the digital image signal output from said conversion means;

detection means for detecting a predetermined time period in the analog image signal generated from said image pickup means; and control means for controlling an operation state of said conversion means so that a power consumption state of said conversion means is smaller during the predetermined time period than during a different time period.

30. Apparatus according to claim 29, wherein the predetermined time period includes a vertical blanking period of the analog image signal.

31. Apparatus according to claim 29, wherein said image pickup means includes an image pickup device having a color filter, and wherein said image pickup means generates an analog color image signal.

32. Apparatus according to claim 31, wherein the analog color image signal comprises a plurality of different kinds of color-component signals which are time-division multiplexed.

33. Apparatus according to claim 32, wherein said digital image signal processing means includes:

a simultaneous processing circuit for performing simultaneous processing of the digital color image signal output from said conversion means, and for outputting the resultant signals; and a digital matrix circuit for forming new digital color image signals using the signals output from said simultaneous processing circuit.

34. Apparatus according to claim 29, wherein said control means controls said conversion means so that said conversion means is placed in a lower power consumption state during the predetermined time period than during other time.

35. Apparatus according to claim 29, wherein said control means includes electric power supply means for supplying power to said conversion means for controlling the converting operation of said conversion means, and wherein said control means varies the supply of power from said electric power supply means to said conversion means during the predetermined time period and the different time period.

36. Apparatus according to claim 29, wherein said control means includes electric power supply means for supplying power to said conversion means to control the converting operation of said conversion means, and wherein said control means stops the supply of power from said electric power supply means to said conversion means during the predetermined time period.

37. Apparatus according to claim 7, wherein said control means controls said conversion means so that said conversion means is placed in a lower power consumption state during the predetermined time period than during other time periods.

38. Apparatus according to claim 7, wherein said control means includes electric power supply means for supplying power to said conversion means to control the converting operation of said conversion means, and wherein said control means varies the supply of power from said electric power supply means to said conversion means during the predetermined period of time and a different time period.

39. Apparatus according to claim 7, wherein said control means includes electric power supply means for supplying power to said conversion means to control the converting operation of said conversion means, and wherein said control means stops the supply of power from said electric power supply means to said conversion means during the predetermined period of time.

40. An image signal processing apparatus for processing image signals, comprising:

conversion means for receiving an analog image signal, for converting the received analog image signal to a digital image signal, and for outputting the digital image signal; and control means for controlling an operation state of said conversion means so that a power consumption state of said conversion means is smaller during a predetermined time period than during a different time period.

41. Apparatus according to claim 40, wherein the predetermined time period includes a vertical blanking period of the analog image signal.

42. Apparatus according to claim 40, wherein the analog image signal includes an analog color image signal comprising a plurality of different kinds of analog color-component signals which are time-division multiplexed.

43. Apparatus according to claim 40, wherein said control means controls said conversion means so that said conversion means is placed in a lower power consumption state during the predetermined time period than during other time periods.

44. Apparatus according to claim 40, wherein said control means includes electric power supply means for supplying power to said conversion means to control the converting operation of said conversion means, and wherein said control means varies the supply of power from said electric power supply means to said conversion means during the predetermined time period and the different time period.

45. Apparatus according to claim 40, wherein said control means includes electric power supply means for supplying power to said conversion means to control the converting operation of said conversion means, and wherein said control means stops the supply of power from said electric power supply means to said conversion means during the predetermined time period.

* * * * *

UNITED STATES PATENT AND TRADEMARK OFFICE
CERTIFICATE OF CORRECTION

PATENT NO. : 5,552,836
DATED : September 3, 1996
INVENTOR(S) : KOUSUKE NOBUOKA

It is certified that error appears in the above-indentified patent and that said Letters Patent is hereby corrected as shown below:

<u>At [57] Abstract</u>

Line 10, "it" should read --is--.

<u>Column 4</u>

Line 34, "according" should read --according to--.

<u>Column 8</u>

Line 48, "time." should read --time periods.--

Signed and Sealed this

Eighteenth Day of March, 1997

Attest:

BRUCE LEHMAN

Attesting Officer

Commissioner of Patents and Trademarks